United States Patent [19]

O'Connor et al.

[11] Patent Number: 4,780,883
[45] Date of Patent: Oct. 25, 1988

[54] DATA MODEM WITH ADAPTIVE SYNCHRONIZED SPEED CHANGE

[75] Inventors: Donald C. O'Connor, Miami; Juan E. Farias, Sunrise; Raul F. Fernandez, Miami, all of Fla.

[73] Assignee: Racal Data Communications Inc., Sunrise, Fla.

[21] Appl. No.: 878,765

[22] Filed: Jun. 26, 1986

[51] Int. Cl.$^4$ .............................................. H04B 1/38
[52] U.S. Cl. ............................................ 375/7; 375/58; 375/121; 370/103; 371/46
[58] Field of Search ................... 375/7, 8, 58, 34, 121; 370/103; 371/2, 43, 44, 45, 46

[56] References Cited

U.S. PATENT DOCUMENTS

| | | | |
|---|---|---|---|
| 3,457,550 | 7/1969 | Gibson et al. | 375/58 |
| 3,534,264 | 10/1970 | Blasbalg et al. | 375/34 |
| 3,536,840 | 10/1970 | Sullivan | 375/58 |
| 4,385,384 | 5/1983 | Rosbury et al. | 371/22 |
| 4,438,511 | 3/1984 | Baran | 370/19 |
| 4,541,045 | 9/1985 | Kromer,III | 364/200 |
| 4,562,426 | 12/1985 | Forney, Jr. | 375/27 |
| 4,578,800 | 3/1986 | Yasuda et al. | 375/106 |
| 4,583,236 | 4/1986 | Kromer et al. | 371/46 |
| 4,589,111 | 5/1986 | Adachi | 371/32 |
| 4,606,044 | 8/1986 | Kudo | 375/58 |
| 4,630,126 | 12/1986 | Kaku et al. | 375/58 |

FOREIGN PATENT DOCUMENTS 0154565 11/1985 European Pat. Off. .................. 375/8

OTHER PUBLICATIONS

"The Viterbi Algorithm", *Proceedings of the IEEE*, vol. 61, No. 3, Mar. 1973; Forney, Jr.; pp. 268–278.
Hayes, "The Viterbi Algorithm Applied to Digital Data Transmission", *Journal of Communications Society*, vol. 13, pp. 15–20, Mar. 1975.
*Computer Design*, Oct. 15, 1985, p. 108.
Codex 2600 Series Advertisement, 1985.
Codex Model 2660 Modem, 10/85.

*Primary Examiner*—Benedict V. Safourek
*Assistant Examiner*—Andrew J. Telesz, Jr.
*Attorney, Agent, or Firm*—Jerry A. Miller

[57] ABSTRACT

A method for changing the data transmission rates in a synchronous data communication system including a first modem and a second modem coupled together through a transmission channel, the transmission channel including a first path for transmissions from the first modem to the second modem and a second path for transmission from the second modem to the first modem, includes the steps of determining, at the first modem, that the second path of the transmission channel is adequately high in quality to support an increase in transmission rate. Next it is determined, at the second modem, that the first path of the transmission channel is adequately high in quality to support an increase in transmission rate. A training sequence is then transmitted at an increased transmission rate from the second modem to the first modem. Next, a training sequence is transmitted at the increased transmission rate from the first modem to the second modem.

16 Claims, 8 Drawing Sheets

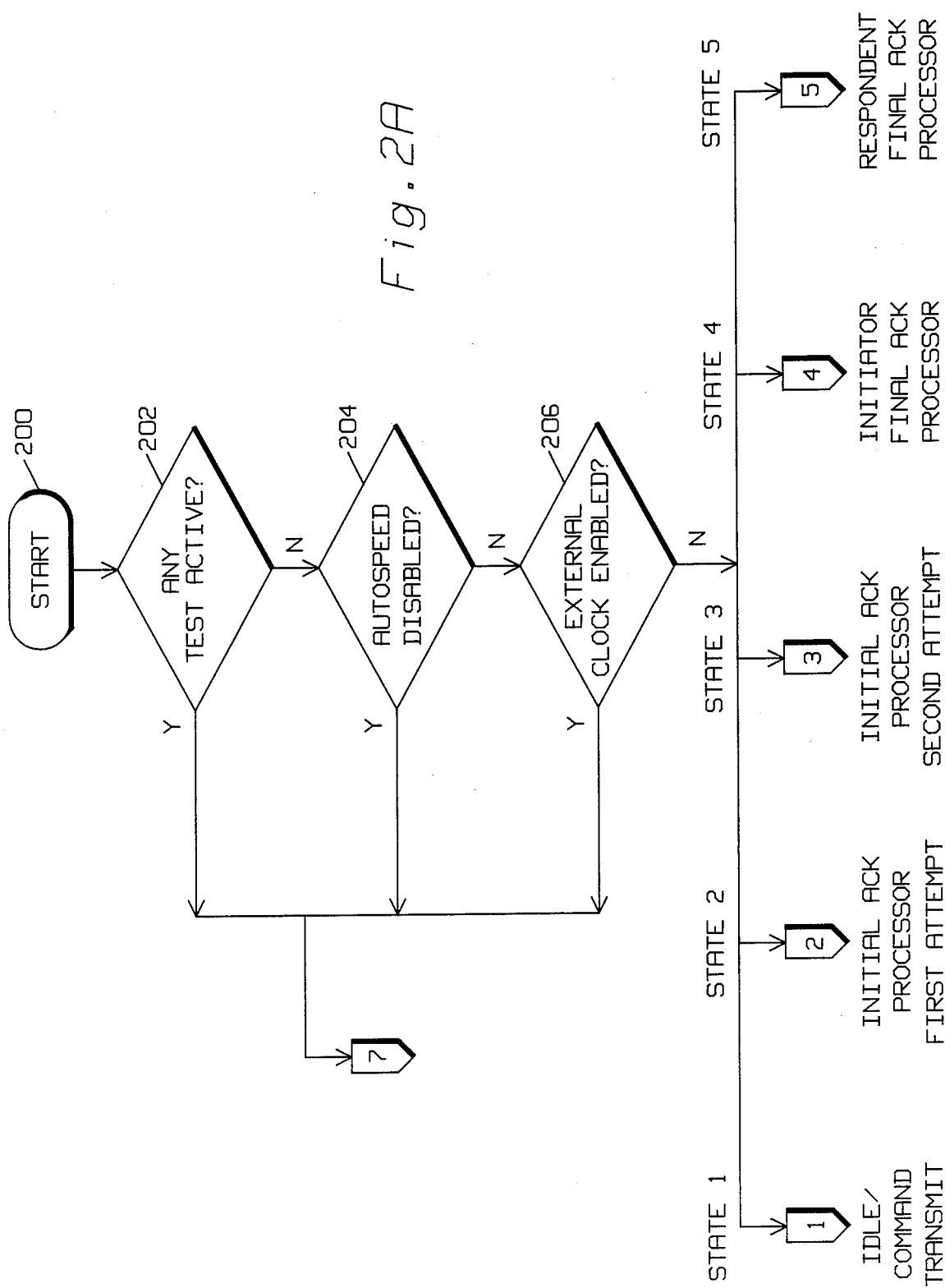

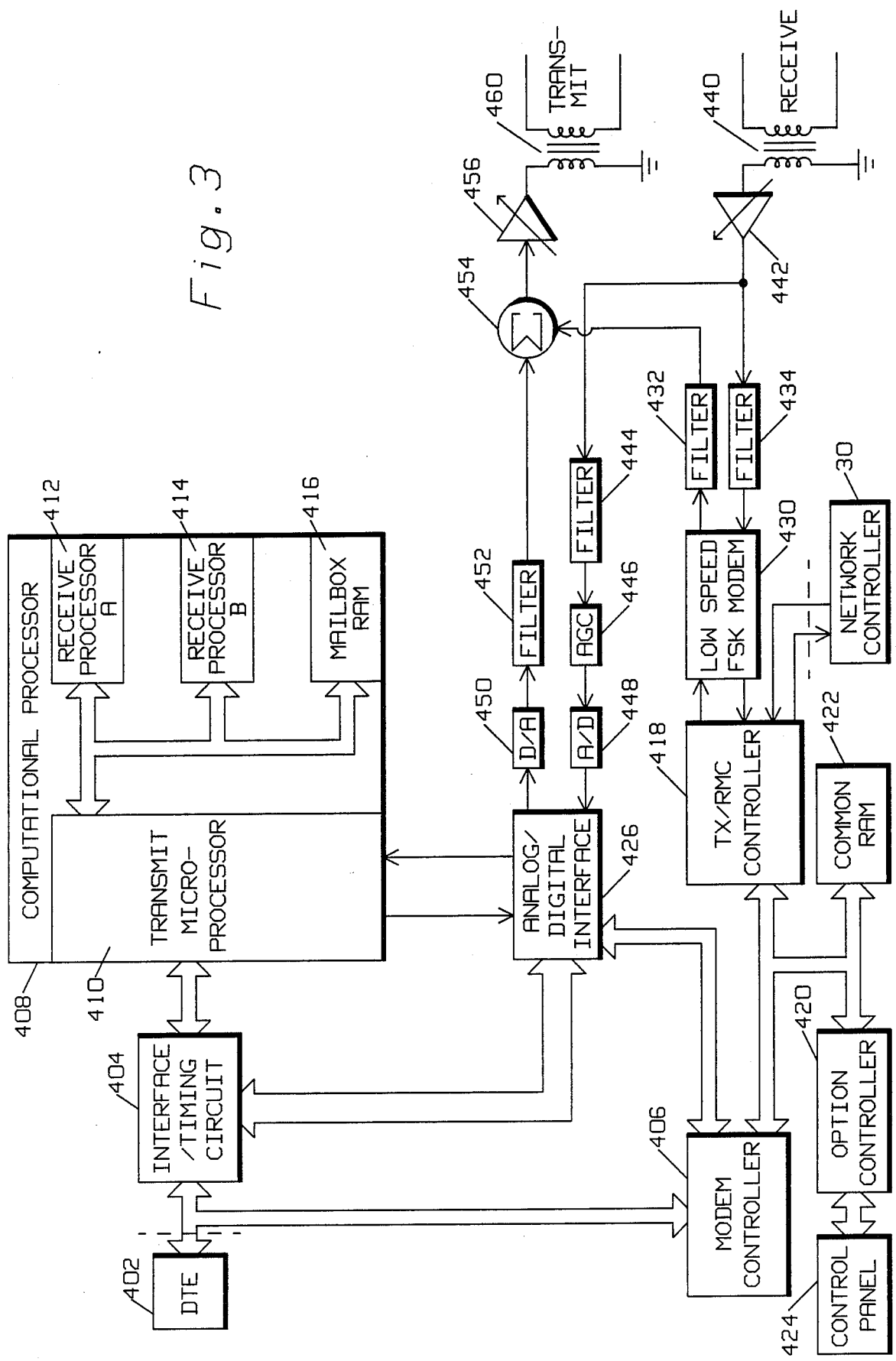

DATA MODEM WITH ADAPTIVE SYNCHRONIZED SPEED CHANGE

BACKGROUND

1. Field of the Invention

This invention relates generally to the field of modems suitable for data communications at varying data transmission rates. More particularly, this invention relates to a data modem which adaptively adjusts its transmission rate in accordance with line quality to optimize data throughput over changing transmission lines.

2. Background of the Invention

It is known in the art that data communication over telephone transmission lines may be accomplished at data rates which are related to the quality of transmission line being utilized. That is, higher quality conditioned transmission lines are generally capable of transmission rates greater than those of, for example, simple voice grade transmission lines. Line quality varies significantly even among transmission lines which supposedly have similar conditioning. In addition, the quality of a particular leased circuit may vary from day to day. It is therefore possible to achieve higher rates of transmission over some lines than others due to variables such as line length, weather, time of day and age of the lines. As such, it is advantageous to provide a mechanism for measuring and monitoring line quality and having data modems adapt to the quality of lines so that data throughput is maximized for a given set of lines and line conditions.

Modem manufacturers have recognized the above problems and have proposed various circuits which attempt to maximize data throughput. For example, U.S. Pat. No. 4,4387,511 to Baran discloses a high speed modem suitable for dialup telephone lines in which the telephone pass-band is subdivided into 64 sub bands each with its own carrier. Each carrier is individually amplitude and phase modulated in order to transmit at a relatively low data rate on each carrier. The net result is a relatively high data rate. Baran's modem determines during a training period which portions of the telephone line spectrum may be most effectively utilized to carry data. Those carriers which are most impaired, are dropped in order to reduce the effective data rate while maximizing data throughput for a given set of channel impairments. Unfortunately, the Baran modem is not currently compatible with existing network control and diagnostic systems such as the Racal-Milgo ® CMS series of network control and diagnostic equipment. Also, Baran's modem is only able to measure line conditions during its initial training period. Any line improvements occurring after that training period will not be recognized or accounted for, thus possibly reducing effective utilization of Bandwidth.

Other modem manufacturers have provided mdems which are capable of speed changes to adapt to varying line conditions also. However, such designs have generally failed to recognize and deal with the fact that the quality of a four wire line can vary such that line quality is high one direction of transmission (one pair of wires) and low in the other direction. Furthermore, this condition can change so that the situation is reversed. These systems are not designed to function optimally with the above mentioned advanced diagnostic and network control systems. In addition, some such systems may be actually detrimental to data throughput by continually interrupting user data in an attempt to convert to a higher data speed on a marginal or asymmetrical set of transmission lines.

Another problem with such modems is a less than optimal speed change protocol which can result in two modems temporarily winding up at different speeds which cause disruption of user data until a reinitialization occurs. This results primarily when one modem which is assigned absolute control over speed increases at any given time blindly assumes that it upspeed command correctly reaches its counterpart. An upspeed command which is not properly received due to, for example, phase hits on the line can cause such situations. It is also possible that power failures, brown outs and the like can cause neither modem to retain control over increases in speed so that a pair of modems is locked at a speed which is lower than the optimum transmission rate.

The Codex ® model 2660 modem uses an interruptive inband signaling as part of its speed change protocol. No secondary channel signaling is used. While this modem has a mechanism for switching its master/slave relationship similar to the present invention, the protocol for speed changes is less than optimal in that it allows one modem to demand upspeed without consulting the other. This can result in two modems operating at different speeds if the command to change speeds is damaged in transmission. It also has less immunity to confusion over master/slave identity or transmission speed in the event of brownout or damage to control signals in transmission.

While the above problems are not exhaustive of those which are encountered in modems having adaptive speed features, they serve to illustrate a substantial need for improvement in this area. The present invention alleviates many of these problems as well as providing a protocol with minimal user data interruption as well as minimizing secondary channel interruption while providing a high degree of reliability in speed change signaling.

SUMMARY OF THE INVENTION

It is an object of the present invention to provide an improved data modem having an adaptive synchronized speed change feature.

It is an advantage of the present invention to provide an improved data modem having a coordinated adaptive method of adjusting data transmission speed to maximize data throughput over a given set of transmission line conditions.

It is another advantage of the present invention to provide a system for changing modem speeds which accounts for transient phenomenon such as amplitude and phase hits.

It is another advantage of the present invention to provide a data modem with adaptive speed adjustment which is compatible and harmonious with secondary channel network management and diagnostic systems.

It is another advantage of the present invention to provide an improved data modem having separate decision mechanisms governing speed increases and speed decreased.

These and other objects and advantages of the invention will become apparent to those skilled in the art upon consideration of the following description of the invention.

In one embodiment of the present invention a method for changing the data transmission rates in a synchronous data communication system including a first modem and a second modem coupled together through a transmission channel, the transmission channel including a first path for transmission from the first modem to the second modem and a second path for transmission from the second modem to the first modem, includes the steps of determining, at the first modem, that the second path of the transmission channel is adequately high in quality to support an increase in transmission rate. Next it is determined, at the second modem, that the first path of the transmission channel is adequately high in quality to support an increase in transmission rate. A training sequence is then transmitted at an increased transmission rate from the second modem to the first modem. Next, a training sequence is transmitted at the increased transmission rate from the first modem to the second modem. Preferably, the determining steps are carried out by comparing the average minimum cost function of a Viterbi decoder with a predetermined threshold and weighting transient phenomenon so that the line quality is measured predominantly on the basis of relatively long term averages.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 3 is a hardware block diagram of a modem of the present invention.

DETAILED DESCRIPTION OF THE INVENTION

Figure 1:
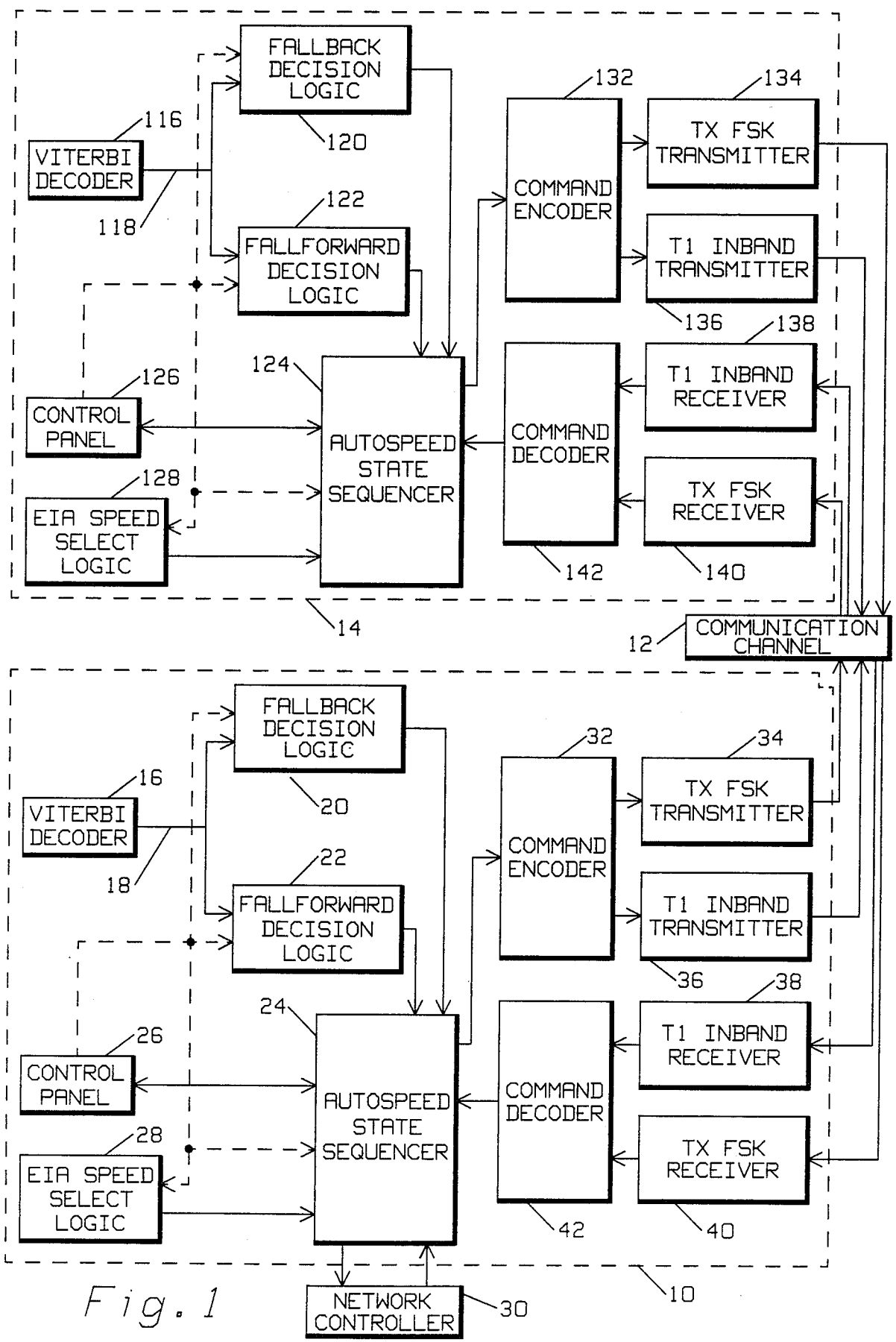
FIG. 1 is a functional block diagram of a pair of modems incorporating the present invention.

In the preferred embodiment of the present invention a convolutional encoded modem utilizing Viterbi decoding forms the heart of the present data modem. Viterbi decoders are now well known and commonly used in the modem art to achieve maximum likelihood sequence estimation decoding of convolutionally coded data. Such decoders are described, for example, in Forney, "The Viterbi Algorithm", Proceedings of the IEEE, Vol. 61, No. 3, March 1973; Hayes, "The Viterbi Algorithm Applied to Digital Data Transmission" Journal of Communications Society, Vol. 13, pages 15-20, March 1975, U.S. Pat. Nos. 4,578,800 to Yasuda, et al.; and 4,562,426 to Forney, Jr. These documents are incorporated by reference as though disclosed fully herein.

Preferably, the modem of the present invention operates over four wire conditioned telephone lines such as 3002, +D−1, or CCITT M1020 lines. The present invention is especially useful for high speed data modems operated under such conditions at 12,000 BPS and above, but of course this is not to be limiting. In the preferred embodiment, the present modem is capable of operating at either 12,000, 14,400 or 16,800 BPS depending upon the quality of the transmission line. Also, the present modem is preferably designed for compatibility with known network control and diagnostic systems such as those disclosed in U.S. Pat. No. 4,385,384 to Rosbury et al. This patent is incorporated by reference as though disclosed fully herein. Such diagnostics and control functions, for purposes of the present application, are referred to as operating on a TX channel (a TX channel is a secondary channel preferably utilizing low speed FSK modulation at 75 to 150 bits per second). For purposes of the present discussion, the terms "TX" and "TX Equipment" refer to systems including a network controller communicating via secondary channel. User data is modulated over the communication channel utilizing convolutional coding with a 256 point constellation at 16.8 KBPS, a 128 point constellation at 14.4 KBPS and a 65 point constellation at 12 KBPS.

Inband network control signals may also be utilized by preceding control signals such as those used to initiate speed changes with a training sequence or other suitable mechanism for encoding control signals into the user data stream. In the preferred embodiment, Racal-Milgo ® T1 inband signaling is utilized. Briefly, T1 signaling is a form of signaling implemented as an unidirectional message transmission having the following format: [modem training sequence] [brief squelch] [127 symbols of carrier] [sync signal] [short (T1) signaling message at 2400 baud, one bit per symbol] [brief squelch] [modem training sequence] [user data]. While this form of inband signaling is preferred, it will be clear to those skilled in the art that many other forms of signaling may be used to serve an equivalent purpose. Thus, references to T1 signaling herein should be viewed only as illustrative.

The present invention contemplates both upspeed and downspeed conversions (referred to hereinafter as fall forward or fallforward and fall back or fallback respectively). Further, the present invention contemplates utilization in systems with and without network controllers. In those systems without a network controller, remote modem control (RMC) may be utilized with secondary channel signaling as well as inband signaling to effect speed changes. In those systems having a network controller, the system utilizes a combination of T1 inband signaling and secondary channel signaling to effect speed changes. Remote Modem Control is a feature common in the art which allows a single modem, such as the Omnimode ® series modem manufactured by Racal-Milgo ®, to be used to control features characteristics and options of remote modems from its control panel. In this RMC environment, the modem's control panel acts as the network controller in a limited capacity. In these environments, the secondary channel diagnostics and control functions are assumed to have high priority. Thus, this protocol is designed to disrupt secondary channel data as well as user data as little as possible.

In systems having neither RMC nor a network controller (that is, there is no secondary channel) the speed change protocol is implemented with inband T1 signaling in a manner which is least disruptive of user data. However, a high level of acknowledgement is retained to assure that each modem remains aware of the other's condition at all times, thus largely eliminating disruptive reinitialization.

The present invention finds greater utility in four wire leased line environments in which it is possible that one pair of wires may be capable of handling a higher speed of transmission than the other pair. There is of course no way to know which pair of wires will be likely to support the higher or lower transmission rates at any given time. It is therefore advantageous to provide a protocol which will enable the modem transmitting on the line with the greatest likelihood of having the lowest capacity to dominate in order to establish an orderly mechanism for such control. To achieve this, one modem is designated "master" and the other is designated "slave". The modem which is designated as the master modem will always initiate a fallforward speed change.

At power up, communication begins at a speed which is established either from the control panel or from the modem's nonvolatile memory (that is, the most recent speed used by the modem). Speed increases will occur if possible until the highest tolerable rate is achieved. If any modem in the system is unable to reliably transmit over the channel, it can initiate a fallback to the next lower speed. If the modem is operating in the T1 environment the modem which last requested a fallback is designated master and is the only modem which may initiate an increase in speed. In this manner, the modem at all weakest link in the communication channel is generally assured of controlling the speed of the entire network. In the RMC or TX environment, the central site modem is always designated master.

Turning now to FIG. 1, a functional block diagram of a data communication system including the present invention is shown. The system of FIG. 1 represents a point-to-point data communication system including a modem 10 coupled through a communication channel 12 to a second modem 14. Those skilled in the art will recognize that modems 10 and 14 include many other elements not shown but which are standard and well known in the modem art. Modem 10 includes a Viterbi decoder 16 which is used in the modem's receiver to decode the inband transmitted data. In addition, Viterbi decoder 16 produces a binary signal computed from a minimum cost function at its output 18. The signal at output 18 is referred to as "Cost SQ" (Signal Quality) herein. (The term "cost" as used herein is often referred to in the art as "metric" or "". The cost as used herein means the magnitude of the euclidean distance between a received constellation point and the ideal constellation point). The cost function at output 18 is obtained by summing the euclidean distance between the received signal point and the closest ideal point over a trellis path history of the previous N bauds. The average minimum cost is then obtained by integrating this minimum cost over a predetermined number of bauds. The output of the Viterbi decoder is a number that is processed by fallback and fallforward decision logics.

The minimum cost information is provided to fallback decision logic 20 which includes a counter for counting the number of retrain attempts necessitated by data errors in the received data. The output 18 of Viterbi decoder 16 is also provided to a fall forward decision logic block 22 which processes the cost SQ signal at 18 to determine if a speed increase is possible. The output of fallback decision logic 20 is a fallback request signal which is transmitted to an auto speed state sequencer 24 the operation of which (along with fall back decision logic 20 and fall forward decision logic 22) is described by the flow chart of FIG. 2. The output of fall forward decision logic 22 can be viewed as a request for an increase in speed which is also provided to auto speed state sequencer 24.

The output of 22 is provided in the form of a logic level. This logic level is obtained by comparing the average minimum cost from the Viterbi algorithm to a predetermined threshold. When the signal quality is high (therefore the average minimum cost is low) this comparison results in a logical 1 at the output of 22. When line quality degrades below the predetermined threshold, the logic level at the output of 22 drops to a logic 0. Those skilled in the art will recognize that various transient phenomenon such as phase or amplitude hits can result in temporary or transient line degradation. Since it is desirable to establish transmission speed based upon longer term avearge line quality, it is desirable to provide a mechanism for accounting for such transient phenomenon in the speed change decision making process. This mechanism operates as follows:

In the preferred embodiment, cost Sq is integrated in the fallforward decision logic 22 for approximately 8 minutes, 15 minutes, 1 hour or 2 hours depending on an integration time strap which is user selectable. The timer times are selected to be much shorter than a typical time period in which transmission line quality changes (frequently hours, days or even weeks). In this manner, transient phenomenon are given a small weight in determining overall transmission line quality. If the integration timer expired, then a fallforward flag is set and a request to fall forward sent from logic 22 to state sequencer 24. While cost SQ is being integrated the modem receiver can be affected by line impairments (phase hits, amplitude hits, etc). If the effect of the impairments on the cost SQ is not significant, then the integration will continue with no interruption. If the effect of the impairments is significant then the integration timers will be re-started. Transient impairments will cause the cost SQ to become "bad" for a certain time interval. This time interval is mapped into a count (see Table 1). The count is then added to the count that resulted from previous impairments. Finally the composite count is compared against a threshold (see Table 2), which value depends on the integration time selected by the strap. If the maximum count is exceeded at any given time then the integration timer is re-started. It will be understood that the values in Tables 1 and 2 were determined experimentally to achieve the desired results. Many variations of this mapping arrangement may be possible without departing from the present teachings.

TABLE 1

| Cost SQ "Bad" Duration | Associated Count |
|---|---|
| Less than 853 msecs | 0 |
| 853 msecs to 1.28 secs | 1 |
| 1.28 secs to 1.7 secs | 2 |
| 1.7 secs to 2.13 secs | 3 |
| 2.13 secs to 2.56 secs | 4 |
| 2.56 secs to 2.98 secs | 5 |
| 2.98 secs to 3.41 secs | 6 |
| 3.41 secs to 3.84 secs | 7 |
| 3.84 secs to 4.27 secs | 8 |
| 4.27 secs to 4.69 secs | 9 |
| 4.69 secs to 5.00 secs | 10 |
| greater than 5.00 secs | Counter is Restarted |

TABLE 2

| Cost SQ Integration Time | Maximum Count |
|---|---|
| 8 minutes | 20 |
| 15 minutes | 30 |
| 1 hour | 120 |
| 2 hours | 240 |

Speed change requests as well as other information may also be manually requested via a control panel 26. Control panel 26 is also coupled to fall forward decision logic and fall back decision logic as well as an EIA RS 232 speed select logic block 28 so that control panel 26 may provide configuration information to each of these blocks. Such configuration information is utilized to inform the various parts of the modem exactly what soft strappable configuration the modem is currently in. Control panel 26 is also utilized to override automatic speed change information as desired by the user via its direct connection to the auto speed state sequencer 24. EIA RS-232 speed select logic block 28 serves to process the data rate signal from a DTE per circuit CH of a standard RS-232 interface. In the present invention this is accomplished by selecting the data rate which is soft strapped into the modem from the control panel in response to DTE speed change commands. Speed changes may also be initiated manually by a network controller 30.

Speed change commands from the auto speed state sequencer 24 are encoded for transmission over the communication channel 12 by a command encoder 32 prior to transmission either by a T1 inband transmitter 34 or a TX FSK transmitter 36 depending upon whether inband signaling or secondary channel signaling is to be utilized for implementing the speed change. Such speed change commands received from modem 14 are received either by a T1 inband receiver 38 or a TX FSK receiver 40 prior to processing by a command decoder 42. When such commands are decoded by decoder 42 they are forwarded to auto speed state sequencer 24 for further processing.

Modem 14 may be similarly configured to include a Viterbi decoder 116 having an output 118 coupled to a fallback decision logic block 120 and a fall forward decision logic block 122. Blocks 120 and 122 are coupled to a similar auto speed state sequencer 124. A control panel 126 is similarly coupled to blocks 120, 122, 124 and EIA speed select logic block 128. State sequencer 124 is coupled to a command encoder 132 which provides speed change commands to inband transmitter 134 and FSK transmitter 136. An inband receiver 138 and a FSK secondary channel receiver 140 feed incoming commands to command decoder 142 in a manner similar to that of modem 10.

In order to reliably effect a speed increase, a handshaking protocol having two levels of acknowledgement is established. Also, in a point-to-point communications environment, a master/slave relationship is created between modem 10 and modem 14. In general, the modem which most recently required a speed decrease is established to be the master modem in the T1 environment. In the TX/RMC environment, the central site modem is always master. Only the master moden may initiate speed increases. In this manner the modem which most recently had the poorest quality line always has control over increases in speed.

According to the present invention, two possible protocols for speed change may be utilized depending upon whether secondary channel is available for use (RMC or TX environment) or not (T1 environment).

To illustrate the speed change protocol in the T1 environment, assume that modem 10 has most recently requested a speed decrease (fallback) so that modem 10 is the master modem and modem 14 is the slave modem. If the line quality is measured by Viterbi decoder 16 of modem 10 is high enough so that modem 10 determines that it can support an increase in transmission speed, it transmits a request to increase speed to modem 14. In this situation where no network is transmitted via inband transmitter 34. If modem 14 is unable to support an increase in transmission rate, it acknowledges the request and responds that it is unable to support a speed increase. At this point, the master/slave modem identities are switched so that modem 14 now controls speed increases. In this manner, speed increases remain under control of the modem which is receiving the poorest quality signal. In the event that modem 14 does not receive the request for speed increase initially transmitted by modem 10 due to some line impairment, modem 10 waits for 10 seconds to again attempt to increase speed. If a second attempt fails, modem 10 will restart its cost SQ integration timer.

When the master receives a training sequence at the new speed it will return a training sequence at the new speed. The master will abort the handshake if it does not receive an acknowledgement from the slave within 10 seconds or if after it squelches carrier it does not receive a training sequence from the slave within 5 seconds. The slave will abort the handshake if it does not detect the squelch within 10 seconds of its transmission of an acknowledgement. If the handshake is aborted due to the loss of an acknowledgement, the master will retry the handshake. If the second attempt fails then subsequent attempts will be inhibited for the duration of the Retry timer.

When the master receives a training sequence at the new speed it will return a training sequence at the new speed. The master will abort the handshake if it does not receive an acknowledge from the slave within 10 seconds or if after it squelches carrier it does not receive a training sequence from the slave within 5 seconds. The slave will abort the handshake if it does not detect the squelch within 10 seconds of its transmission of an acknowledgement. If the handshake is aborted due to the loss of an acknowledgement, the master will retry the handshake. If the second attempt fails then subsequent attempts will be inhibited for the duration of the Retry timer.

In this T1 environment, if the modem 14 is able to support a speed increase it transmits a positive acknowledgement signal back to modem 10. Upon receipt of this positive acknowledgement, modem 10 drops its carrier (squelches its transmitter) as an acknowledgement to modem 14's acknowledgement. Modem 14 then transmits a training sequence at the next higher data rate, followed by a training sequence from modem 10 to modem 14 and normal data communication at the higher rate resumes. This protocol provides minimal user data disruption in the event upspeed cannot be accommodated. When upspeed can be accomplished it provides a protocol which assures that the speed change is well coordinated between both modems so that no loss of master/slave identity occurs and transmission rates are always synchronized.

In the TX/RMC environment, the protocol is as follows. Modem 10 is assumed to be the central site modem and therefore is strapped as the master modem. When signal quality as measured at the central site warrants an increase in data transmission rate, modem 10 transmits a request to fallforward to modem 14 via its FSK secondary channel transmitter 36. This request is destined for modem 14's secondary channel receiver 140. Upon requesting a fall forward in speed by modem 10, fall forward decision logic 22 initiates a timer which runs for a predetermined period of time (30 seconds in the preferred embodiment) while an acknowledgment from modem 14 is awaited.

If modem 14 is unable to support an increase in transmission rate, it will not respond to modem 10's request. If modem 10 does not receive a positive acknowledgment within 30 seconds it retransmits the request (one time). If modem 10 again does not receive or reply within 30 seconds, it assumes that modem 10 cannot operate at the requested data rate. Modem 10 will then restart its cost SQ integration timer. Subsequent retries can only be made after the duration of this timer (8, 15, 60 or 120 minutes). Therefore, rather than repeatedly interrupt the secondary chanel's limited available transmission band with apparently fruitless attempts to increase in speed, modem 10 will wait for a much longer period of time (8, 15, 60 or 120 minutes, strap selectable in the preferred embodiment) to see if line conditions change to allow modem 14 to increase in speed. The exact times of the above timers may be varied to optimize operation in various environments. This form of negative acknowledgment (NO REPLY) has the distinct advantage that user data is never interrupted by an unsuccessful attempt. A second advantage of this methodology is that it results in minimal interruption of network control functions.

The fall foward integration timers in the master and slave modems are not exactly synchronized. For a successful auto speed handshake, the slave modem is the first to send a training sequence at the new speed. Hence the master modem starts to integrate the computational fall forward flag before the slave. The offset in the two timers could be as much as a minute. Therefore the integration timer in the slave is set to be 2 minutes less than the master (i.e. 58 minutes rather than 60 minutes). The integration timer is reset by either a successful or unsuccessful fall forward attempt or the computational flag being false.

In the case of a positive acknowledgment, modem 14 will reply with positive ACK using T1 inband signaling. This presents no problem interrupting user data since the modems must be retrained at the new data rate anyway.

In the preferred embodiment, the modem may be strap selectable to request fall forward when the line quality is such that the expected block error rate at the new data rate is either 0/1000 or 5/1000 as desired by the user. Retrains are instituted at block error rates of either 30/1000 or 500/1000 (user strappable). This has been found to provide adequate hysteresis to prevent unnecessary speed changes under marginal line conditions.

If the upspeed which is effected is not the maximum speed of the modem, the aforementioned processes may be repeated if the line quality is capable of supporting further speed increases. By utilizing the aforementioned protocol, both user data and secondary channel communication interruption is minimized by use of no acknowledgment equating to a negative acknowledgment in the TX/RMC environment and minimizing user data interruptions in both the TX/RMC and T1 environments.

If after a period of time, either modem 10 or 14 determines that it can no longer support a higher data rate, either modem may initiate a speed fall back. Although a fall forward is a speed change which must be mutually agreed upon by both modems 10 and 14, a speed fall back is a non-negotiable speed change which may be instituted on demand by either modem upon determining that it cannot support the data rate presently being used. This inability to support the higher data rate, is determined in the preferred embodiment by counting the number of retrain requests occurring over a period of time. In the preferred embodiment, the fall back criteria may be strap selectable to either four (4) retrain attempts within one (1) minute or six (6) retrain attempts within fifteen (15) minutes, but these specifics are not to be limiting. These criteria have been established experimentally and may not be optimal under all conditions. They have, however, been found suitable for a wide range of general applications. Since either modem may demand a fallback and since retraining is required for fallback, T1 signaling is preferably always used for fallback. There is no need to disrupt the secondary channel at all when implementing a fallback. Since a fallback is not negotiable, user data must be interrupted so it is preferable to use inband signaling.

Since the fall forward process is dependent upon which modem is designated master, it is important that the condition of both modems being designated as slave be voided. This is accomplished in the preferred embodiment by having each modem at power up always start at a known transmission rate and gradually increase speed (if possible) through the aforementioned process until the most rapid data rate tolerable by the transmission lines is established. Further, at power up and subsequent to a brown out or a power out or after cahnge in strapping, a reinitialization of modem master/slave relationship is established. Whenever a modem is powered up, it sends an initialization command sequence to the other modem telling that modem to assume a master or slave identity opposite that of the modem transmitting the initialization command sequence. In this manner, it is always assured that one modem will assume the identity of the master and one will assume the identity of slave. At the conclusion of a successful speed change handshake in the TX environment, the central modem sends a speed change alert message to the network controller to inform the network controller of the new data rate.

The speed change operation is controlled primarily by fall back decision logic blocks 20 and 120, fall forward decision logic blocks 22 and 122 in conjunction with the auto speed state sequencers 24 and 124. The operation of these functional blocks as well as their relationship to other functional blocks is described in the flow chart shown in FIG. 2. For ease of illustration and description FIG. 2 has been subdivided into FIGS. 2A through 2F.

The process begins at start block 200 after which a series of three checks 202, 204 and 206 are made to determine if any tests are active, if auto speed has been disabled or if the external clock has been enabled. A positive response to any of these three queries leads the process to block 208 of FIG. 2B where the signal quality (SQ) integration timer is initialized. Once the signal quality integration timer is initialized all other timers, flags and command registers are initialized at step 210 and the process ends at 212. It will be understood that since the process is repetitive, control always passes from 212 to 200.

State sequencer 24 (or 124) may assume any of five possible states 1 through state 5 of FIG. 2A. When negative responses are received in response each of tests 202, 204 and 206 the route taken by the process at the output of decision block 206 is determined by the state of the state sequencer at that point.

Figure 2B:
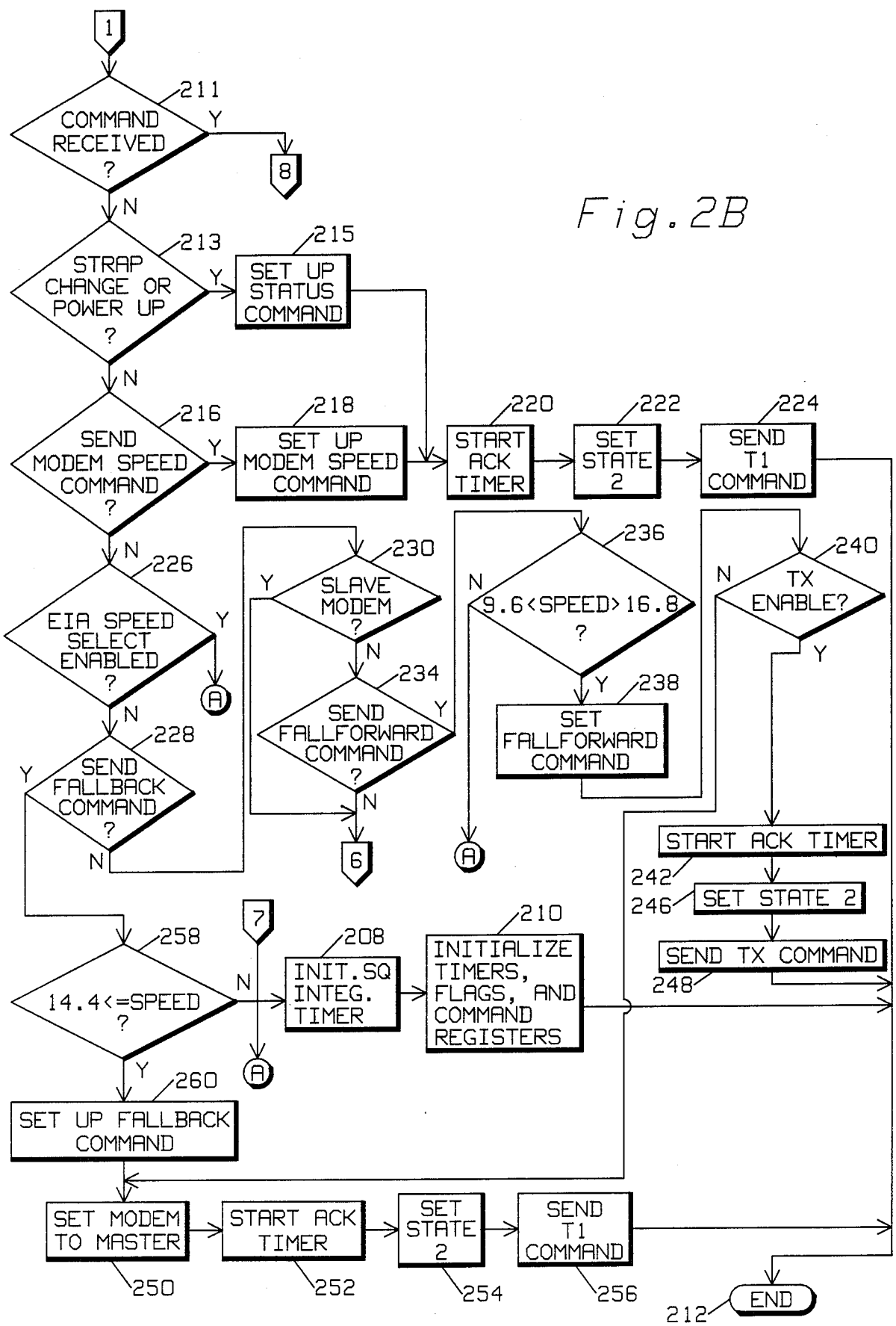
FIG. 2, including FIG. 2A through FIG. 2F is a flow chart describing the operation of the present invention.
Figure 2C:
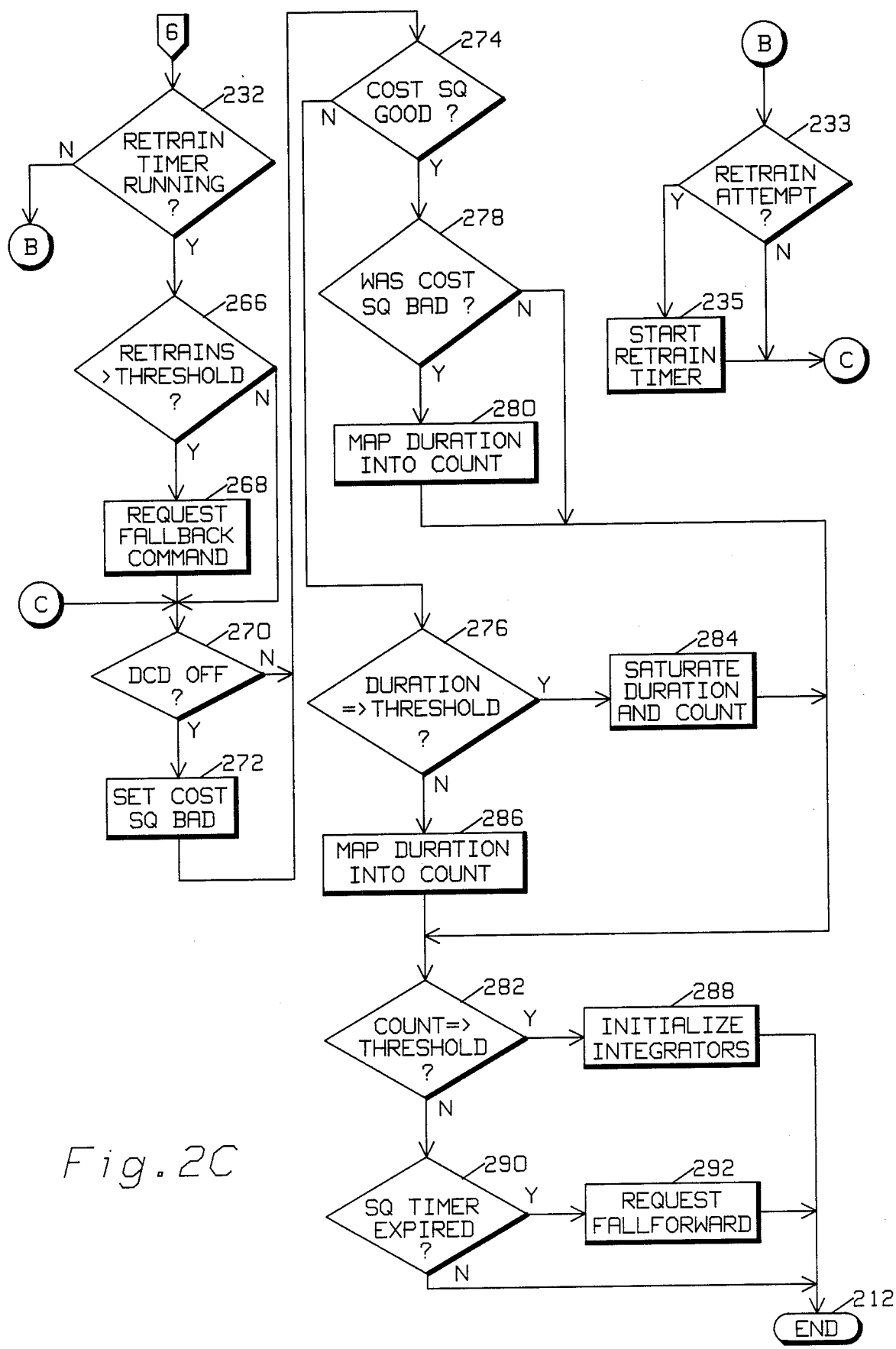
Figure 2D:
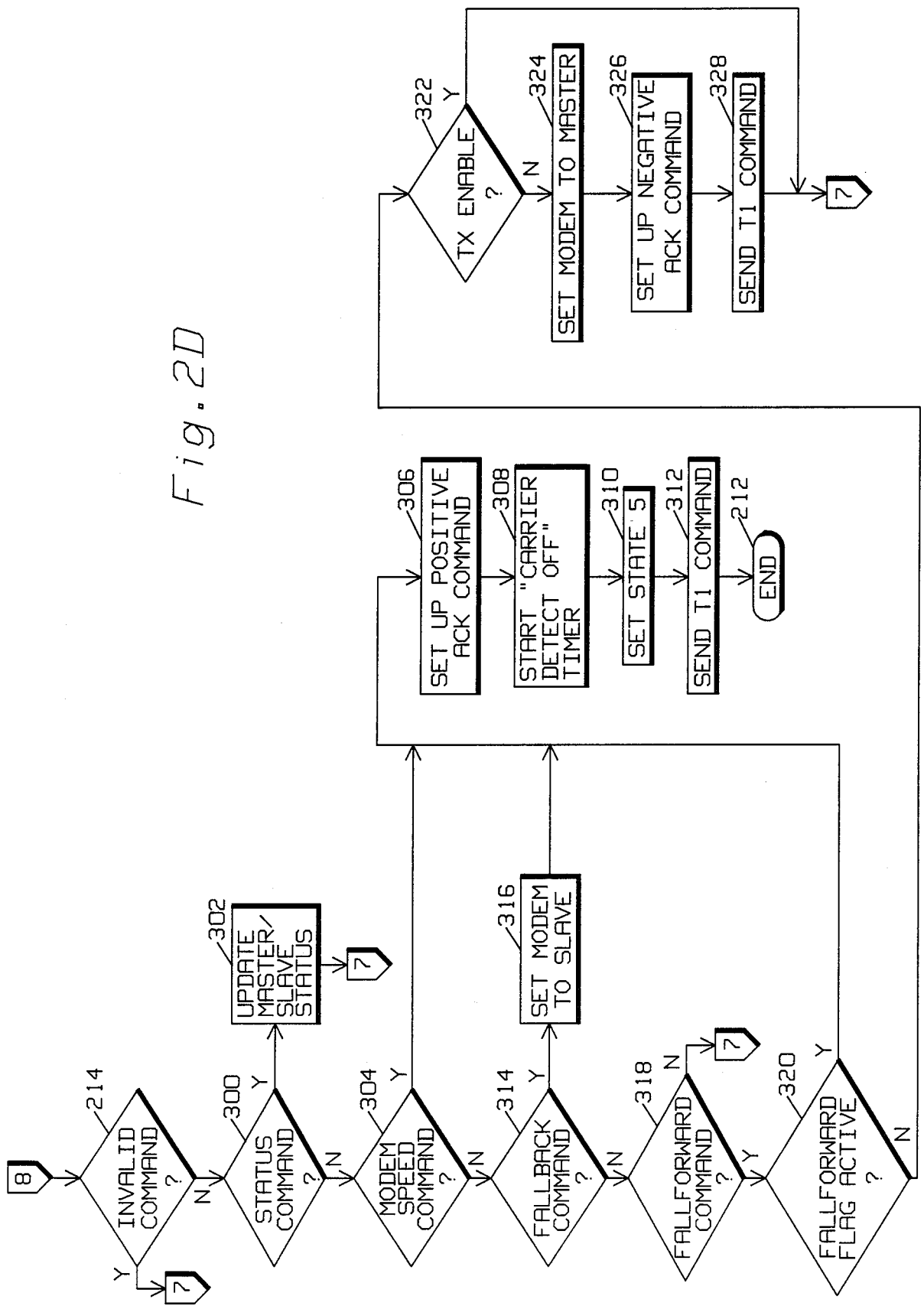

If the state sequencer is in state 1, which represents an idle state where no commands are being sent or received, then process control goes to decision block 211 of FIG. 2B if a command is received at 211 control of the process goes to decision block 214 of FIG. 2D. Otherwise, control passes to decision block 213 of FIG. 2B. If there has been a strap change or power up, a status command (reinitializes master/slave relationship) is set up at 215. An acknowledgment timer (implemented in 24) which allows for a predetermined time period to wait for an acknowledgment to the speed change command is started at block 220. The state of the machine is changed to state 2 at 222 and a T1 command is sent at 224. The process then goes to step 212. If a strap or power has not changed then control passes to decision block 216 of FIG. 2B. If a modem speed command is to be sent at block 216 the command is set up at 218. This is a command caused by input from the control panel or the RS 232 interface. If a modem speed command is not to be sent at 216, then state sequencer 24 inspects the EIA speed selector logic 28 to determine if it enabled at step 226. If the EIA speed select is not enabled at 226 then control passes to decision block 228. If a fall back command is not to be sent at 228 then the modem checks to see if it is the master or the slave at 230. If it is the slave at 230 then control passes to decision block 232 of FIG. 2C. Otherwise control passes to block 234. If a fall forward command is not to be sent at 234, control similarly passes to 232 of FIG. 2C. If the fall forward command is to be sent, then the speed is checked at 236 to determine if the speed is greater than 9.6 KBS and less than 16.8 KBPS. If so, the fall forward command is set at 238. Control then passes to decision block 240 where it is determined whether or not the TX FSK transmitter is enabled. That is, it is determined whether or not the system is utilizing secondary channel capabilities. If so, the acknowledgment timer (implemented in 24) is set at 242, state 2 is set at 246 and the TX command is sent (using secondary channel) at 248 and the process goes to step 212.

If TX is not enabled at 240, then the modems designation is changed to master at 250. The acknowledgment timer is set at 252 and state 2 is set at 254. The T1 command to change speeds is sent at 256 and control passes to block 212. If at step 228, a fallback command is to be sent, the speed is inspected 258 to determine if the speed is greater than or equal to 14.4 KBPS. If so, the fallback command is set up at 260.

Turning now to FIG. 2C (which represents the decision process for setting either an upspeed or downwspeed flag), at step 232 a check is made to determine if the retrain timer is currently running. The retrain timer is a fixed duration timer implemented in 24 which establishes a timer interval in which a predetermined number of retrains may occur without requiring a fall back in modem speed. If the timer is running at 232, a check is made to determine if the number of retrains requested has exceeded a predetermined (strap selectable) threshold at 266. If so, a fall back request command is initiated at 268 and control is passed to block 270. If the retrain timer is not running then control passes to 233. If a retrain attempt has occurred then the retrain timer is started in step 235 and control passes to block 270. Control is passed to block 270 in the event of a negative response at blocks 233 or 266.

DCD (data carrier detect) is inspected at block 270. If DCD is off (indicating that the remote modem is squelched), the cost signal quality is set to bad at 272 and control passes to block 274. Otherwise, control passes directly from 270 to 274.

At 274 the cost signal quality is checked to see if it is good. If not, control passes block 276. If so, control passes to 278 where a check is made to determine if the cost signal quality was bad previously. If so, the duration mapped into the count (at 22) as described previously at 280. At 278 if the cost signal quality was not bad, block 280 is bypassed and control goes directly to block 282.

At step 276, the duration on retrain timer of step 232 is checked to determine if it is greater than or equal to the predetermined threshold. If so, the duration and the count is saturated at 284 and control is passed to decision block 282. If the duration is not greater than or equal to the threshold at 276, then the duration is mapped into the count at 286 prior to passing control to block 282. At block 282, if the count is greater than or equal to the threshold, the integrators are initialized at 288 and control is passed to 212. If the count is less than the threshold at 282 and the signal quality integration/retry timer (implemented in 22) has expired at 290, a fall forward is requested at 292. If the count is less than the threshold at 282 and the signal quality timer has not expired at 290, control is passed directly to 212 bypassing 292.

Turning now to FIG. 2D, which describes how commands are processed, if an invalid command is received at block 214, control passes to block 208 of FIG. 2B. Otherwise, control passes to 300. If a status command is received at 300, the master/slave status of the modem is updated at 302 after which control passes to block 208 of FIG. 2B. If a status command is not received at 300 control passes to 304 which checks to see if a modem speed command has been received. If so, a positive acknowledgment command is set up at 306, a "carrier detect off" timer is started at 308. State is set to five at 310 and the T1 command is sent at 312 after which control is passed to block 212. The "carrier detect off" timer of step 308 (implemented in 24) is used to time a duration for waiting for detection of transmitter squelch at the remote modem. In the preferred embodiment, this timer is set at 6 seconds, but this is not to be limiting.

If a modem speed command is not received at 304, control passes to 314 where it is determined if a fall back command is received. If so, the status of the modem is set to slave at 316 after which control is passed to block 306. If a fall back command is not received at 314, control passes to 318 where it is determined whether or not a fall forward command has been received. If not, control passes to block 208 of FIG. 2B. If a fall forward command is received at 318, a fall forward flag is inspected at 320 to determine whether or not it is active. If so, control passes to 306. The fall forward flag is used by state sequencer 24 to determine that it is appropriate to request command encoder 32 to transmit a speed increase request or to accept a speed increase request from the remote modem.

If the fall forward flag is not active at 320 then step 322 determines whether or not the TX secondary channel is enabled. If it is, control passes to block 208 of FIG. 2B. If it is not enabled at 322 the modem is set to master 324, a negative acknowledgment command is set up at 326 and the T1 command is transmitted at 328. Control is then passed to block 208 of FIG. 2B.

Figure 2E:
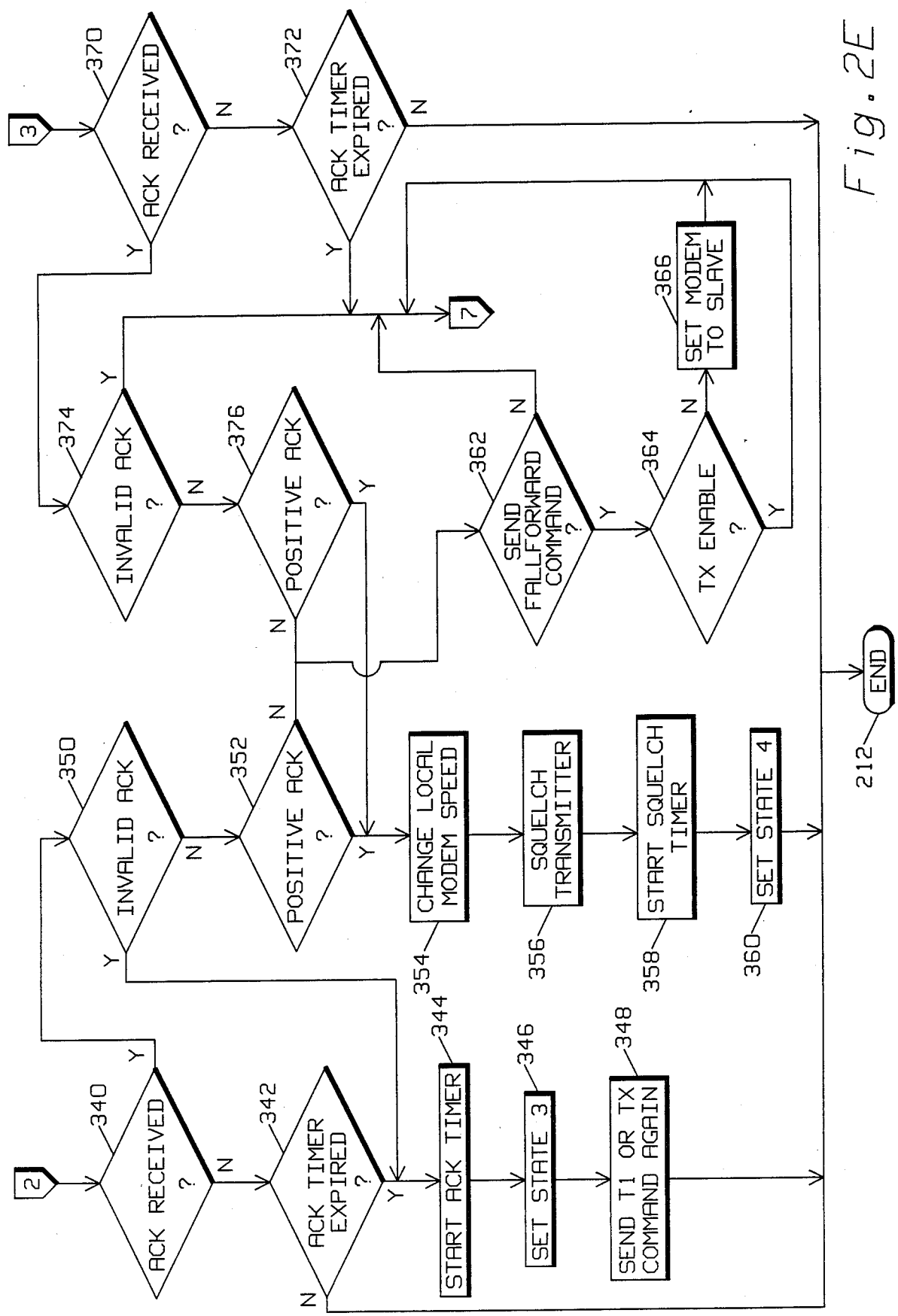

If state sequencer 24 (or 124) is in either state 2 or 3 after step 206 of FIG. 2A the state sequencer's actions are governed primarily by the flow chart of FIG. 2E. If the state sequencer is in state 2, which represents an acknowledgment processing state (that is, a speed change command has been sent and an acknowledgment is expected) then control is passed to step 340 where it is determined whether or not an acknowledgment has been received. If not, control is passed to 342 to determine if the acknowledgment timer has expired. If the acknowledgment timer has been expired, the acknowledgment timer is started at 344, the state sequencer is set to state 3 and 346 and the T1 or TX command is retransmitted at 348. State 3 represents the acknowledge processing for a second attempt. Control then passes to block 212. If the acknowledgment at 342 is not positive, control passes directly to block 212 by passing steps 344, 346 and 348.

If an acknowledgment is received at 340 the validity of the acknowlegment is inspected at 350. If the acknowledgment is invalid at 350 control passes to block 344 (second attempt is initiated) otherwise, control passes to block 352. At block 352, the acknowledgment is inspected to determine if it positive. If it is positive, the local modem speed is changed at 354, the transmitter is squelched at 356. The squelch timer is started at 358 and the state sequencer is set to state 4 at 360.

If a positive acknowlegment is not received at 352, control passes to block 362 where it is determined if a fall forward command is being sent. If so, control passes to 364 to determine if TX is enabled. If TX is enabled then control passes to block 208 of FIG. 2B. Otherwise the modem is set to slave at block 366. If the decision at block 362 is no, control passes to block 208 of FIG. 2B.

If the state sequencer is in state 3, which indicates that an invalid acknowlegment was received in state 2 and an acknowlegment is now being awaited in response to a retransmitted fall forward request, then control is passed to block 370 where it is determined whether or not an acknowlegment has been received. If not, and the acknowledgment timer has not expired, in block 372, then control is passed to 212. If the acknowledgment timer has expired at 372 taken control is passed back to block 208 of FIG. 2B.

If an acknowlegment is received at 370 then its validity is inspected at 374. If it is invalid, then control is passed to block 208 of FIG. 2B otherwise, control is passed to 376. If acknowledgment is not positive at 376 then control is passed to block 362.

Figure 2F:
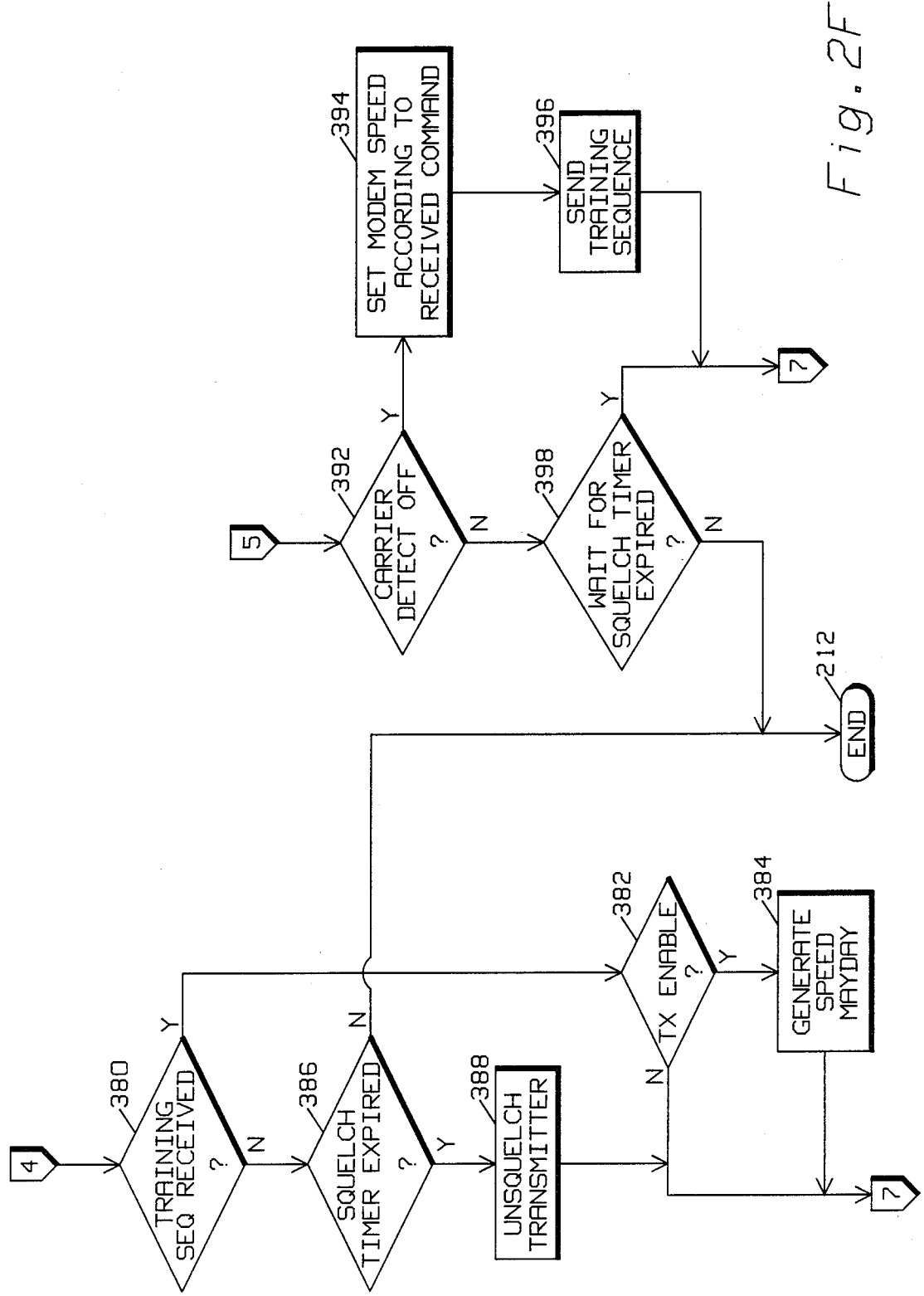

If the state sequencer is in either state 4 or state 5, its actions are governed by the flow charts of FIG. 2F. If the state sequencer is in state 4 it is indicative of a valid acknowledgment having been received by the master (initiator) modem in state 2 or 3 and the transmitter is squelched awaiting receipt of a training sequence from the remote modem. Once the machine is in state 4, control is passed to block 380 where it is determined whether or not a training sequence has been received. If so, control is passed to 382 where it is determined whether or not TX is enabled. If TX is not enabled, control passes to block 208 of FIG. 2B. If however, TX is enabled indicating that secondary channel diagnostics are being utilized, and a network controller is present in the system, then a speed Mayday is generated at block 384 prior to passing control to 208. The speed Mayday generated by 384, informs the network controller of the new data rate (see the Rosbury et al., patent).

If a training sequence is not received at 380, then the squelch timer is inspected at 386 to determine whether or not it has expired. If not, control passes to 212. If the squelch timer has expired, however, the transmitter is unsquelched at 388 prior to passing control to block 208.

If the state sequencer is in state 5 which is indicative of the slave (respondent) modem awaiting squelch so that a training sequence can be sent, then control is passed to block 392. At block 392 carrier detect is inspected to determine whether or not it is off. If carrier detect is off at 392 then the modem speed is set according to the speed command received at step 394 and a training sequence is transmitted at 396 so that communications can be established at the modified speed. Control is then passed to block 208 of FIG. 2B If carrier detect is not off at 392 and the squelch timer (implemented in 24) has not expired in 398 then control is passed to 212. If the squelch timer has expired in 398, control is passed to block 208 of FIG. 2B.

In the preferred embodiment the present invention is implemented utilizing microprocessor technology and the above state sequencer is in the form of a micro computer. However, this is not to be limiting as one skilled in the art will recognize that a dedicated state machine could be designed to provide the functions described above. In the preferred embodiment of the present invention, the various timers described in conjunction with the flow chart operation are implemented in software also. It will be clear to those skilled in the art, however, that the preferred values of these timers may be modified without departing from the spirit of the present invention. It will also be clear that such timers may also be implemented in hardware using known circuitry.

Turning now to FIG. 3, a hardware block diagram of the preferred embodiment of the present invention is shown. Data Terminal Equipment (DTE) 402 is coupled via a standard connection such as RS-232 to an interface/timing circuit 404 and a modem controller 406. Interface/timing circuit 404 is coupled to a computational processor 408 which includes a transmit microprocessor 410. Transmit microprocessor 410 is preferably a custom microprocessor such as that disclosed in U.S. Pat. No. 4,541,045 to Kromer, Ill., the contents which is incorporated by reference. Transmit microprocessor 410 communicates with received processor A 412 and received processor B 414 via a mailbox RAM 416. Modem controller 406 is coupled to TX/RMC controller 418, option controller 420, and a common random access memory 422. Option controller 420 is coupled to a control panel 424 for receiving user input. Modem controller 406 is also coupled to an analog/digital interface 426 which is connected to interface/timing circuit 404 as well as computational processor 408. TX/RMC controller 418 is coupled to an external network controller 30 in the preferred embodiment. TX/RMC controller 418 provides and receives serial data to and from a low speed FSK modem 430. Filters 432 and 434 are used to filter serial low speed FSK data to and from modem 430.

Received data passes through an isolation transformer 440 and is amplified by an amplifier 442 prior to being divided between filter 434 for processing by the low speed FSK modem and a filter 444 which filters the user data and applies it to an automatic gain control circuit 445. AGC circuit 445 drives an analog to digital converter 448 which provides digital data to analog/digital via interface 426.

Outgoing user data is first converted to analog signals by digital to analog converter 450 prior to filtering by filter 452 and combining at adder 454. The output of adder 454 is amplified by an amplifier 456 and provided to transmit isolation transformer 460.

The interface/timing circuit 404 serves to generate transmit and receive clocks for the DTE as well as providing serial to parallel conversion for the transmit data and parallel to serial data for the received data. Interface/timing circuit 404 also includes logic and other circuitry for performing digital loop tests as is known in the art. Transmit microprocessor 410 configures the interface/timing circuit 404 and reads the transmit data and writes the received data through its parallel interface thereto. The analog/digital interface 426 generates the baud clocks and some of the bit clocks used by the interface/timing circuit 404.

The analog/digital interface provides bit and baud clock generation as well as interface between the modem controller and the transmit processor. The modem controller 406 configures the analog/digital interface through a parallel interface. The transmit processor sends and receives configuration and status information from the modem controller 406 through the analog/digital interface.

The transmit processor 410 of computational processor 408 scrambles the transmit data read from the interface/timing circuit 404 and encodes the scrambled transmit data. Transmit microprocessor 410 also generates transmit symbols from the encoded transmit data and generates the transmit samples for the digital to analog converter. Transmit microprocessor 410 also controls the AGC based on energy information derived from the samples from the analog to digital converter and from the received processor. Transmit microprocessor 410 also controls the received timing generation on the analog/digital interface based on information coming from the received processors. Transmit microprocessor 410 is also used to write received data to the interface/timing circuit 404 and exchange status and configuration information with the modem controller 406. Received processors 412 and 414 get received samples, configuration and status information from the transmit processor through the mailbox RAM 460. Clock information is recovered from the received channel and the received samples are phase split and equalized and then sliced into symbols. Viterbi decoding (the functional blocks of FIG. 1 associated with the present speed change invention) is implemented in processor 414 to convert the symbols into data in a known manner. Unscrambling is also implemented in processors A and B on the decoded data. Processors 412 and 414 also update equalizer taps based on Viterbi decoder cost function and calculates signal quality and fall forward flags based on the Viterbi decoder cost function.

Modem controller 406 sends configuration information to The analog/digital interface 426, interface/timing circuit 404 and the receive and transmit processors. Transmitted and receive related DTE signals based on DTE interface and transmit processor information are processed by the modem controller also. Modem controller 406 also generates master timing for the common RAM access and implements the auto speed state sequencer and fallback and fallforward decision logic (20 and 22). Modem controller 406 also controls the tests that the system can perform.

Option controller 420 implements control panel control as well as keeping and managing system configuration information. Option controller 420 also controls the common RAM access memory for any options and manages communication between the modem and the options.

The TX/RMC controller 418 operates in one of two modes. In the TX mode, it serves to communicate to the network controller through a serial interface on a central site or through secondary channel on a remote site. It also serves to transiate network diagnostic and management commands into modem commands for putting a modem into various test modes and requesting status information or generating alarms. In the RMC mode the TX/RMC controller 418 serves to communicate to remote modems through the secondary channel. It also serves to translate RMC commands into modem commands vice versa for conducting tests, requesting status information or generating alarms. In the preferred embodiment, received processors 412 and 414 are preferably general purpose microcomputers based upon the Texas Instruments ® TMS 3020 series microprocessors but this is not to be limiting as other high speed microprocessors could be utilized to implement the present invention.

THUS it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. In a data communication system including a first modem and a second modem coupled together through a transmission channel, said transmission channel including a first path for transmission from said first modem to said second modem and a second path for transmission from said second mdem to said first modem, a method for coordinating a change in the transmission rates of said first and second modems, the method comprising the ordered steps of:

attempting to train and retrain said modems;

determining, at said first modem, that said second path of said transmission channel is adequately high in quality to support an increase in transmission rate;

transmitting a request to increase speed from said first modem to said second modem;

determining, at said second modem, that said first path of said transmission channel is adequately high in quality to support an increase in transmission rate wherein the step of determining includes mapping a duration of time wherein said signal quality is deemed to be poor into a count, accumulating said count to produce an accumulated count and comparing said accumulated count to a predetermined maximum count for a predetermined time line so that upspeed decisions can occur with a moderate amount of transient impairment; and wherein said mapping step includes assigning integer values to time periods of poor signal quality such that larger integers are assigned to longer periods of poor signal quality and smaller integers are assigned to shorter periods of poor signal quality, and the count is totaled for said time limit;

acknowledging said request to increase speed from said first modem by transmitting an acknowledgment signal from said second modem to said first modem;

squelching transmission at said first modem;

transmitting a training sequence at said increased speed from said second modem to said first modem; and transmitting a traning sequence at said increased speed from said first modem to said second modem.

2. The method of claim 1, further comprising the steps of:

establishing, at either one of said first and second modems, that either path of said transmission channel is inadequately high in quality to support the current transmission rate;

transmitting a training sequence at a decreased transmission rate from said one modem to the other of said first or second modem; and transmitting a training sequence at said decreased transmission rate from said other modem to said one modem.

3. The method of claim 2, wherein said establishing step includes the steps of:

counting a first number of retraining attempts occurring within a second predetermined time period;

comparing said first number with a first predetermined maximum count; and ensuring that said first predetermined count is exceeded by said first number.

4. The method of claim 2, wherein said one modem is designated master and said other modem is designated slave, and wherein future increases in transmission rate are required to be initiated by said master.

5. The method of claim 1, further including the steps of:

starting a first timer of first predetermined duration upon transmitting said request; and retransmitting said request if an acknowledgment has not been received prior to expiration of said first timer.

6. The method of claim 5, further including the steps of:

restarting said timer upon retransmitting said request;

starting a second timer of second predetermined time period if said first timer expires without receipt of said acknowledgment, said second time period being much longer in duration than said first time period; and inhibiting further retransmitting of said request until after second timer has expired.

7. The method of claim 1, wherein said request to increase speed is transmitted via inband signaling.

8. The method of claim 1, wherein said determining steps are carried out by evaluating the average minimum cost output of Viterbi decoder.

9. The method of claim 1, wherein said mapping is approximately given by:

| Duration of poor signal quality | Associated Count |
| --- | --- |
| Less than 853 msecs | 0 |
| 853 msecs to 1.28 secs | 1 |
| 1.28 secs to 1.7 secs | 2 |
| 1.7 secs to 2.13 secs | 3 |
| 2.13 secs to 2.56 secs | 4 |
| 2.56 secs to 2.98 secs | 5 |
| 2.98 secs to 3.41 secs | 6 |
| 3.41 secs to 3.84 secs | 7 |
| 3.84 secs to 4.27 secs | 8 |
| 4.27 secs to 4.69 secs | 9 |
| 4.69 secs to 5.00 secs | 10 |
| greater than 5.00 secs | Counter is Restarted | and said time limit and maximum count are approximately selected from:

| Accumulated Time | Maximum Count |
| --- | --- |
| 8 minutes | 20 |
| 15 minutes | 30 |
| 1 hour | 120 |
| 2 hours | 210. |

10. In a data modem, a circuit arrangement for effecting transmission speed changes between a pair of modems comprising in combination:

training means for attempting to train and retrain said modem;

first means for establishing the quality of transmission line;

second means for counting retrain attempts as a measure of line quality;

fallback decision means, responsive to said second means, for producing an output representing a demand for reduction in transmission speed whenever a predetermined number of retrain attempts occur within a selected period of time;

fallforward decision means, responsive to said first means, for producing an output representing a request for increase in transmission speed whenever the average signal quality is greater than a predetermined threshold;

establishing means for establishing said data modem as having an identity designated as either master or slave, including means for determining if said modem is the most recent of said pair of modems to demand a speed reduction, and wherein said modem is designated master in the event it is said most recent requester;

transmitting means for transmitting requests for increases and demands for reductions in transmission speed over said transmission line; and inhibiting means for inhibiting said transmitting means from transmitting requests for increases in speed unless said modem's identity is that of master.

11. The data modem of claim 10, wherein said transmitting means includes a low speed secondary channel FSK transmitter.

12. The data modem of claim 10, wherein said transmitting means includes an inband transmitter.

13. The data modem of claim 10, wherein said establishing means includes means for determining if said modem is the most recent of a pair of modems to transmit a negative acknowledgment to a speed change request, and wherein said modem is designated master in the event it is most recent.

14. The data modem of claim 10, further comprising:
means, coupled to said establishing means, for detecting application of a power source; and wherein said establishing means establishes the identity of said modem as well as a remote modem, upon application of a power source.

15. The data modem of claim 10, further including a network controller and means for alerting said network controller of speed changes.

16. The data modem of claim 10, further including:

means for acknowledging requests for increases in transmission speed;

means for squelching a transmitter in response to said acknowledgment; and means for transmitting training sequences at a variety of transmission rates.

* * * * *